United States Patent
Anderson

(10) Patent No.: US 11,995,653 B1
(45) Date of Patent: May 28, 2024

(54) AGE VERIFICATION CARD AND METHOD

(71) Applicant: Donald Anderson, Ajax (CA)

(72) Inventor: Donald Anderson, Ajax (CA)

(*) Notice: Subject to any disclaimer, the term of this patent is extended or adjusted under 35 U.S.C. 154(b) by 0 days.

(21) Appl. No.: 17/643,503

(22) Filed: Dec. 9, 2021

(51) Int. Cl.
*G06Q 20/40* (2012.01)

(52) U.S. Cl.
CPC .................................. *G06Q 20/401* (2013.01)

(58) Field of Classification Search
CPC ..................................................... G06Q 20/401
See application file for complete search history.

(56) References Cited

U.S. PATENT DOCUMENTS

| | | | | |
|---|---|---|---|---|
| 10,853,795 B1* | 12/2020 | Capurso | ............... | G06Q 20/352 |
| 2003/0001006 A1* | 1/2003 | Lee | ........................ | G07F 7/1008 |
| | | | | 235/381 |
| 2004/0153421 A1* | 8/2004 | Robinson | ............... | G06Q 20/20 |
| | | | | 705/75 |
| 2010/0089995 A1* | 4/2010 | El-Awady | ........... | H04M 17/106 |
| | | | | 235/382 |
| 2011/0320037 A1* | 12/2011 | Frugone | ................. | G06Q 20/40 |
| | | | | 340/5.9 |
| 2014/0224883 A1* | 8/2014 | Aiyer | .................... | G07F 7/0806 |
| | | | | 235/492 |
| 2021/0369014 A1* | 12/2021 | Vukich | .............. | G06Q 30/0234 |
| 2021/0390556 A1* | 12/2021 | Bermudez | ............ | G06Q 20/405 |

FOREIGN PATENT DOCUMENTS

WO   WO-2012140625 A1 * 10/2012 ........... G06Q 20/204

* cited by examiner

*Primary Examiner* — Bennett M Sigmond
*Assistant Examiner* — Raven E Yono
(74) *Attorney, Agent, or Firm* — Orin Del Vecchio

(57) ABSTRACT

An age verification payment card and method that employs a card wherein the card has a first embedded chip and a second embedded chip. The present invention includes a first chip for providing financial authorization for a purchase and a second chip that provides age verification of the cardholder to ensure that the cardholder meets any minimum age requirement for a purchase having that requirement. The method includes a step of collecting and verifying the age of the card applicant during the application process. This data is stored on the second embedded chip so as to provide the retailer a technique to verify the age of the cardholder wherein an age limit may be applicable to a purchase. The present invention will provide an age alert to a retailer in the event that the cardholder does not meet the minimum age requirement for the purchase being attempted.

7 Claims, 2 Drawing Sheets

AGE VERIFICATION CARD AND METHOD

FIELD OF THE INVENTION

The present invention relates generally to age dependent purchase verification, more specifically but not by way of limitation, a payment card wherein the payment card is configured to provide both a payment method for a purchase and an age verification for the purchase if required.

BACKGROUND

Most individuals utilize a bank card for payment of goods and services. Bank cards are provided in two primary forms wherein the two primary forms are credit cards and debit cards. These cards have embedded therein bank account or similar information that will provide financial approval for a desired purchase of a good or a service. A typical consumer will present this card at the time of purchase and the financial information will be verified. The most current type of credit cards or debit cards includes an embedded chip instead of a magnetic strip wherein the embedded chip adds additional security in facilitating the financial transaction.

Many purchases made by bank cards require a minimum age limit. By way of example but not limitation, the purchase of alcohol or tobacco products in most countries can only be done by individuals that are of a minimum age. During these transactions, it is often common for the retailer to not only require the method of payment but further require the purchaser to produce some identification that provides verification of their age. This can create not only a cumbersome experience for the purchaser but additionally create an uncomfortable interaction for both the purchaser and the retailer. Additionally, conventional purchasing techniques require the purchaser to have in their possession both a form of payment and a form of identification that provides age verification. While existing chip cards provide secure financial transaction generating a unique pin for each transaction, these embedded chips do not provide age verification.

Accordingly, there is a need for a single method of payment that not only provides a method to financially procure goods and services but further provides age verification of the purchaser for those goods and services that require a minimum age for purchase thereof.

SUMMARY OF THE INVENTION

It is the object of the present invention to provide a card and method of use wherein the card is utilized to procure goods and services that require a minimum age limit wherein the present invention includes a payment card having a first embedded chip and a second embedded chip.

Another object of the present invention is to provide a payment and age verification card operable to facilitate purchase of a good or service having a minimum age requirement wherein the first chip of the present invention includes information to provide financial approval of a purchase.

A further object of the present invention is to provide a card and method of use wherein the card is utilized to procure goods and services that require a minimum age limit wherein the second chip of the present invention contains information to verify the age of the cardholder.

Still another object of the present invention is to provide a payment and age verification card operable to facilitate purchase of a good or service having a minimum age requirement wherein the method of the present invention includes enrolling users and authenticating the age of the user prior to issuing a payment card.

An additional object of the present invention is to provide a card and method of use wherein the card is utilized to procure goods and services that require a minimum age limit wherein the method of the present invention will alert a retailer if the minimum age requirement for the purchase is not met.

Yet a further object of the present invention is to provide a payment and age verification card operable to facilitate purchase of a good or service having a minimum age requirement wherein the method of the present invention is applicable to alternate techniques of electronic payment.

Another object of the present invention is to provide a card and method of use wherein the card is utilized to procure goods and services that require a minimum age limit wherein the payment card of the present invention may further include a photographic image of the cardholder thereon.

Still another object of the present invention is to provide a payment and age verification card operable to facilitate purchase of a good or service having a minimum age requirement wherein the operator of the present invention further incorporates collection of purchase data and shares with retailers in order to improve client services and satisfaction.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
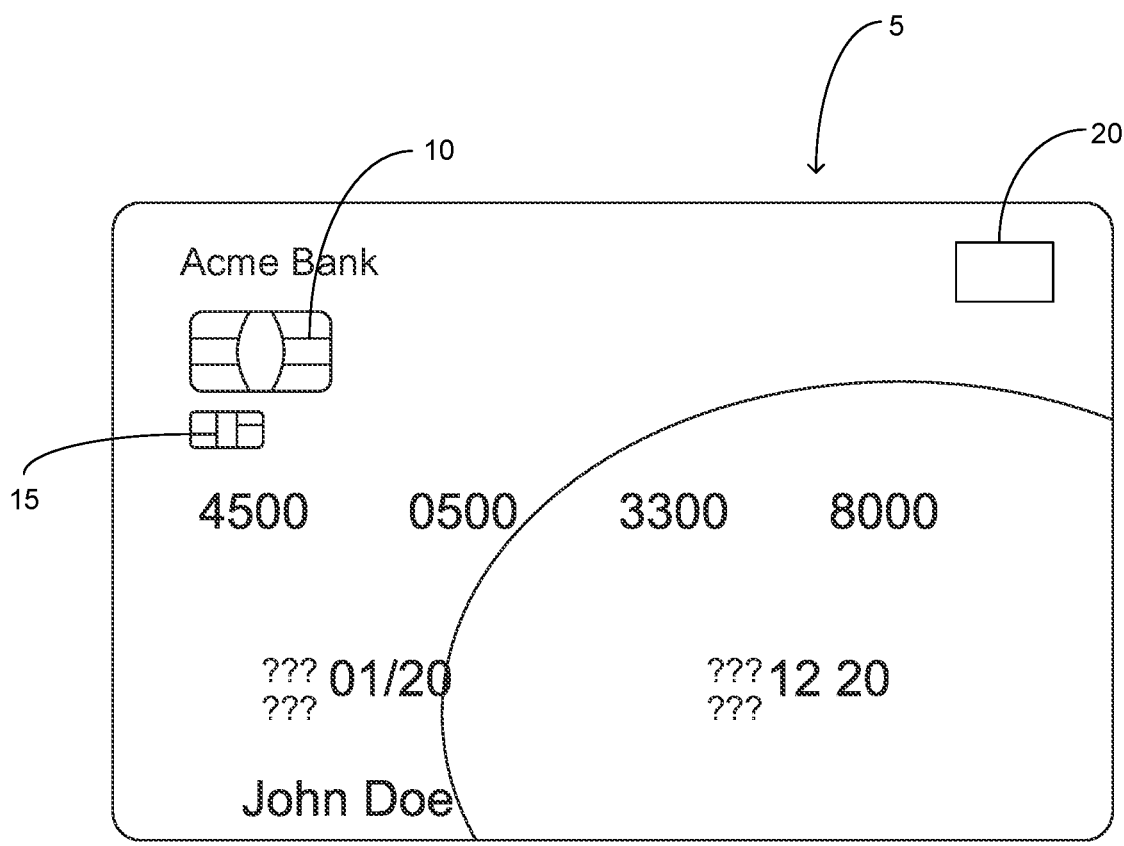
FIG. 1 is a front view of an exemplary card of the present invention.

Referring now to the drawings submitted herewith, wherein various elements depicted therein are not necessarily drawn to scale and wherein through the views and figures like elements are referenced with identical reference numerals, there is illustrated an age verification payment card and method 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted as a part hereof, the age verification payment card and method 100 is executed via a card 5. The card 5 is issued by the operator of the age verification payment card and method 100 and is similar to existing payment cards in that the first embedded chip 10 is configured to provide execution and authorization of the financial transaction. The first embedded chip 10 is a conventional chip and pin transaction chip wherein the first embedded chip 10 will generate a unique pin at each transaction so as to provide financial approval for the transaction. The card 5 further includes a second embedded chip 15. The second embedded chip 15 is configured to provide age verification for a purchase wherein the good or service being purchased has a legal minimum age such as but not limited to alcohol or tobacco. The second embedded chip 15 is proximate the first embedded chip 10 and is smaller in size. Placing the first embedded chip 10 and second embedded chip adjacent to each other enables utilization of existing card readers. It should be understood within the scope of the present invention that the first embedded chip 10 and second embedded chip 15 could be placed in alternate locations. The card 5 further includes an image area 20. The image area 20 is an optional area wherein the photographic image of the cardholder can be placed.

Figure 2:
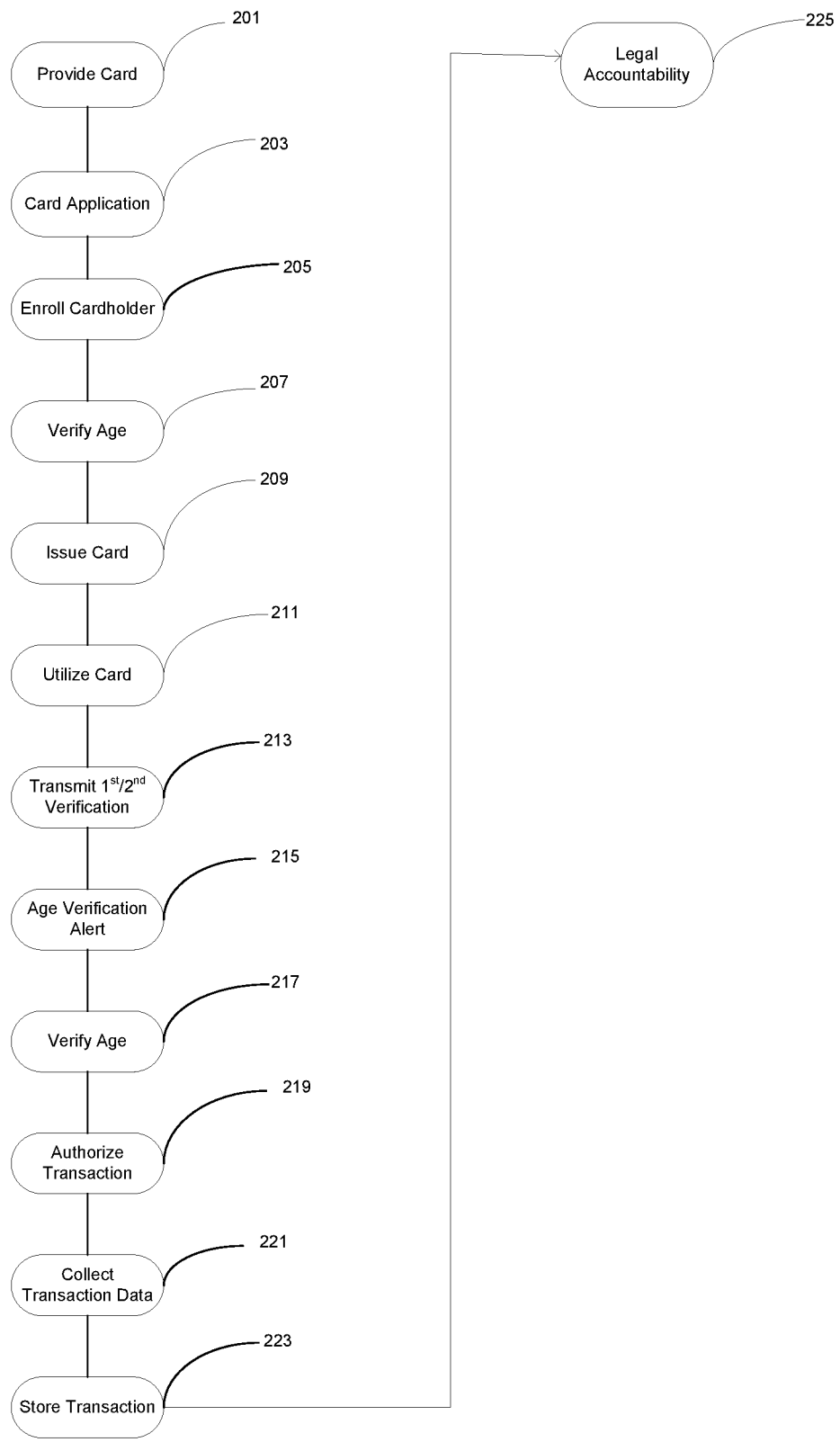
FIG. 2 is a flowchart of the method of the present invention.

Now referring in particular to FIG. 2 submitted herewith, the method of the age verification payment card and method 100 is diagrammed therein. In step 201, the operator of the age verification payment card and method 100 will make available the card 5 to consumers. Step 203, consumers will pursue the application process for the card 5 via a suitable interface such as but not limited to a website of the card provider. In step 205, the operator will enroll the card holder and collect various data parameters about the card holder such as but not limited to name, address and date of birth. Step 207, the operator will execute age verification of the enrolling card holder. It should be understood within the scope of the present invention that this can include verification of the date of birth or further include steps that would involve interface with other entities such as but not limited to governmental agencies wherein a more thorough investigation is conducted to ensure the identity and age of the enrolling card holder is accurate. In step 209, subsequent age verification, the data of the card holder is retained in a created account and the operator of the age verification payment card and method 100 will issue a card 5 to the enrolled cardholder.

Step 211, ensuing receipt of the card 5, the cardholder will utilize the card 5 for a transaction. In step 213, during utilization of the card 5, the card will transmit a first verification and a second verification. The first verification is executed by the first embedded chip 10 wherein the first verification provide authorization for the financial transaction. The second verification is executed by the second embedded chip 15 wherein the second verification provides the retailer with verification of the age of the card holder. In step 215, the retailer is provided an age verification alert. It should be understood within the scope of the present invention that the age verification alert is employed for products that require a minimum age level for purchase. The age verification alert is visually provided to the retailer via their conventional point of sale system. Step 217, the age if the card holder presenting the card 5 is verified and if the age of the card holder meets the minimum legal requirements the transaction is allowed to continue.

In step 219, the operator of the age verification payment card and method 100 provides authorization for the transaction wherein the authorization includes both the aforementioned financial and age verification. In step 221, the operator of the age verification payment card and method 100 collects all of the transaction data for the retailer. Step 223, the collected transaction data is stored utilizing conventional techniques such as but not limited to a computer database. In step 225, either as needed or when required for legal review, the stored data for each of the retailers is reviewed for legal accountability to ensure that all transactions requiring a minimum age met the age verification utilizing the second embedded chip 15. While a card 5 has been discussed herein for use in facilitating the age verification payment card and method 100 it is contemplated within the scope of the present invention that the functionality of the age verification payment card and method 100 could be employed utilizing other techniques of electronic payment terms wherein the techniques could be modified to provide the first verification and second verification of the present invention wherein the second verification provides data about the age of the individual making the financial transaction so as to inhibit a sale to an individual that does not meet the legal age requirement for that good or service.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A payment method operable to provide a first verification and a second verification during purchase of a good or service wherein the method comprises the steps of:
   providing a card, said card having a first embedded chip and a second embedded chip, said card configured to facilitate electronic purchases of good or services;
   enrolling applicants, wherein an operator of the method enrolls potential cardholders for pending issuance of the card;
   verifying an age of the applicants, wherein the operator verifies the age of the applicants during the enrollment process and stores the age of the applicant in the second embedded chip without storing information used for verifying the age of the applicant;
   issuing the card, wherein subsequent to approval for the card, the operator of the method issues the card to the applicant;
   utilizing the card, wherein the applicant utilizes the card at a retailer for an intended purchase;
   executing a first verification, wherein the first embedded chip performs a first verification in order to facilitate a purchase, the first verification validating a financial component of the purchase;
   performing a second verification, wherein the second embedded chip provides a second verification in order to facilitate the purchase, the second verification validating an age requirement component of the purchase using the stored age of the applicant and the second verification is performed concurrently with the first verification;
   providing the retailer information about an age of the applicant, wherein during the purchase the retailer receives information about the age of the applicant if required for an intended good or service of the purchase and information about the age of the applicant compared to the age requirement of the purchase;
   authorizing the purchase, wherein subsequent to completion of the first verification and the second verification the operator provides authorization for the purchase.

2. The payment method operable to provide the first verification and the second verification during purchase of a good or service as recited in claim 1, and further including a step of collecting transaction data, wherein the operator of the method collects and retains data regarding each purchase from the retailer.

3. The payment method operable to provide the first verification and the second verification during purchase of a good or service as recited in claim 2, and further including a step of providing a post-transactional legal review of purchases from a retailer for a selected time period, wherein the operator provides review of the purchases to ensure age requirements were met for each purchase in the selected time period.

4. The payment method operable to provide the first verification and the second verification during purchase of a good or service as recited in claim 3, wherein the step of verifying an age of the applicants further includes collaborating with at least one government agency to provide age verification.

5. The payment method operable to provide the first verification and the second verification during purchase of a good or service as recited in claim 4, and further including a step of providing an age verification alert upon an applicant not meeting an age requirement for a purchase.

6. The payment method operable to provide the first verification and the second verification during purchase of a good or service as recited in claim 5, wherein the age verification alert is provided through a point of sale system of the retailer without displaying the alert to the applicant.

7. The payment method operable to provide the first verification and the second verification during purchase of a good or service as recited in claim 6, wherein the first embedded chip and the second embedded chip are adjacent to each other on the card.

* * * * *